(12) United States Patent
Kakizaki (10) Patent No.: US 8,429,942 B2
(45) Date of Patent: Apr. 30, 2013

(54) RESTRICTION MECHANISM FOR IGNITION SWITCH

(75) Inventor: Masashi Kakizaki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 53 days.

(21) Appl. No.: 13/102,775

(22) Filed: May 6, 2011

(65) Prior Publication Data

US 2011/0278140 A1   Nov. 17, 2011

(30) Foreign Application Priority Data

May 11, 2010  (JP) ................................. 2010-109370

(51) Int. Cl.
*E05B 65/12* (2006.01)
(52) U.S. Cl.
USPC .............................. 70/237; 70/252; 200/43.01
(58) Field of Classification Search ............... 5/182–186, 5/247, 252, 277, 389, DIG. 30; 477/99; 200/43.01, 200/43.03, 43.05, 43.07, 43.08, 43.11
See application file for complete search history.

(56) References Cited

U.S. PATENT DOCUMENTS

| | | | |
|---|---|---|---|
| 3,632,916 A * | 1/1972 | Schaad | 200/43.03 |
| 3,683,133 A * | 8/1972 | Heap et al. | 200/11 C |
| 4,503,411 A * | 3/1985 | Lofstrand | 335/259 |
| 4,659,883 A * | 4/1987 | Poschet | 200/43.03 |
| 4,956,983 A * | 9/1990 | Okamura et al. | 70/241 |
| 6,891,458 B2 * | 5/2005 | Hyatt Jr. et al. | 335/267 |
| 8,079,239 B2 * | 12/2011 | Chung | 70/252 |
| 2002/0029595 A1 * | 3/2002 | Limburg et al. | 70/186 |
| 2004/0099082 A1 * | 5/2004 | Ochi | 74/492 |
| 2009/0298643 A1 * | 12/2009 | Chung | 477/99 |
| 2010/0107709 A1 * | 5/2010 | Chung | 70/251 |
| 2010/0192649 A1 * | 8/2010 | Nakamoto | 70/353 |
| 2011/0277519 A1 * | 11/2011 | Hirashita | 70/237 |
| 2011/0296881 A1 * | 12/2011 | Tamezane et al. | 70/252 |

FOREIGN PATENT DOCUMENTS

JP    2003-343406    12/2003

* cited by examiner

*Primary Examiner* — Lloyd Gall
*Assistant Examiner* — Myles Throop
(74) *Attorney, Agent, or Firm* — James R. Gourley; Colin P. Cahoon; Carstens & Cahoon, LLP (57) ABSTRACT

A vehicle starter switch device including a cylinder, a rotor rotatable in the cylinder to a plurality of rotational positions including a first position and a second position, an ignition switch connected to the rotor, and a restriction mechanism that restricts and permits the rotation of the rotor. The restriction mechanism includes a single solenoid that restricts rotation of the rotor from the first position to the second position when de-energized. The solenoid also permits rotation of the rotor from the second position to the first position when de-energized.

11 Claims, 9 Drawing Sheets

| Gearshift Position | P Position | | | | Not in P Position | | | |
|---|---|---|---|---|---|---|---|---|
| IG Rotor Position | LOCK | ACC | ON | START | LOCK | ACC | ON | START |
| Energized State | O (Verification Accomplished) | × | × | × | / | O | O | × |

O ··· Energized
× ··· De-energized

Fig.11

RESTRICTION MECHANISM FOR IGNITION SWITCH

CROSS-REFERENCE TO RELATED APPLICATIONS

This application is based upon and claims the benefit of priority from prior Japanese Patent Application No. 2010-109370, filed on May 11, 2010, the entire contents of which are incorporated herein by reference.

BACKGROUND OF THE INVENTION

The present invention relates to a restriction mechanism for an ignition switch of a vehicle starter switch device.

A vehicle starter switch device includes an ignition rotor, which is held in a cylinder in a rotatable manner. The rotor is rotated to a LOCK position, an accessory (ACC) position, an ON position, or a START position. In accordance with the position of the rotor, in-vehicle devices are activated and inactivated and the engine is stopped and started. More specifically, when the rotor is located at the LOCK position, power is supplied to none of the in-vehicle devices. When the rotor is located at the ACC position, power is supplied to some of the in-vehicle devices such as the audio equipment. When the rotor is located at the ON position, power is supplied to all of the in-vehicle devices. When the rotor is rotated to the START position, the engine is started. When the rotor is rotated from the ON position to the ACC position after the engine is started, the engine is stopped.

The vehicle starter switch device may be of an operation knob type or a key holding type. In an operation knob type switch device, an operation knob, which is coupled to a rotor, becomes rotatable when ID verification is accomplished between an electronic key and a vehicle. In a key holding type switch device, the rotor becomes rotatable when mechanical verification is accomplished by a key hole formed in a rotor and a key inserted into the key hole. The key for the key holding type may be a key blade type mechanical key or a portable electronic key.

For security reasons, the key holding type switch device includes a mechanism that restricts the removal of the key from the key hole at positions other than the LOCK position and a key interlock mechanism that prevents the removal of the key when a gearshift lever is located at a position other than the parking position. The key interlock mechanism, which is used in both types of switch devices, restricts rotation of the rotor to the LOCK position when the gearshift lever is located at a position other than the parking position.

The operation knob type switch device includes a knob lock that restricts rotation of the operation knob from the LOCK position when ID code verification between the electronic key and the vehicle is not accomplished. The knob lock increases the level of security for the vehicle.

Japanese Laid-Open Patent Publication No. 2003-343406 describes a refraction type solenoid knob lock mechanism and an interlock mechanism for a vehicle starter switch device.

Figure 11:
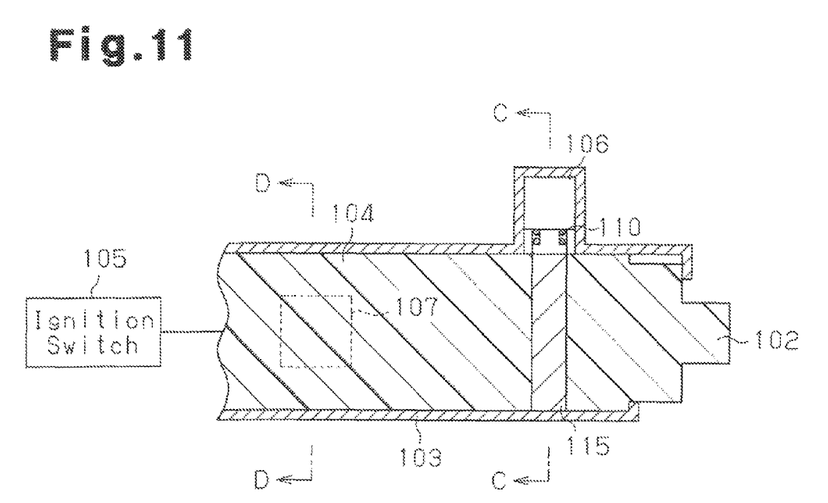
FIG. 11 is a cross-sectional view showing a referential example of a vehicle starter switch device.

The retraction type solenoid knob lock mechanism described in this referential example will now be described. FIG. 11 shows a vehicle starter switch device including an ignition rotor 104, which is arranged in a cylinder 103 and coupled to an ignition switch 105, and an operation knob 102, which rotates the ignition rotor 104. The operation knob 102 is rotated to move the ignition switch 105 to the LOCK, ACC, ON, or START position.

Figure 12A:
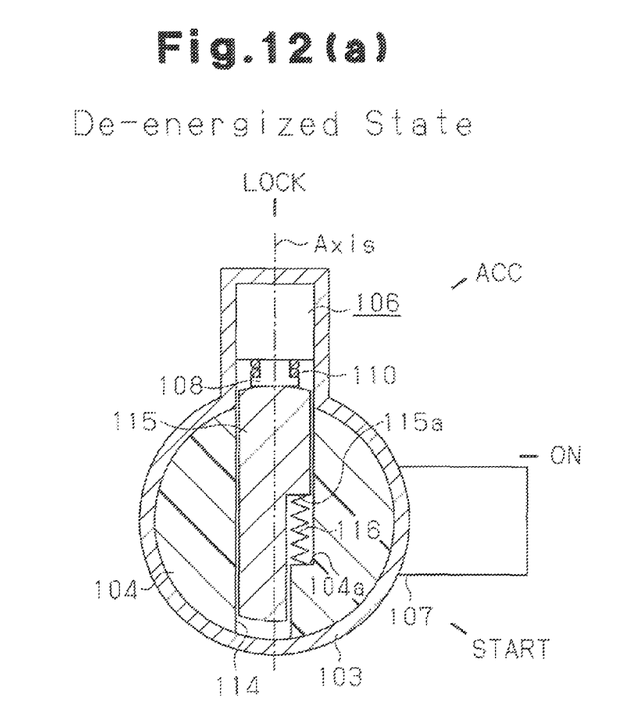
FIGS. 12(a) and 12(b) are cross-sectional views of the vehicle starter switch device taken along line C-C in FIG. 11 respectively showing a restriction state and a permission state.
Figure 12B:
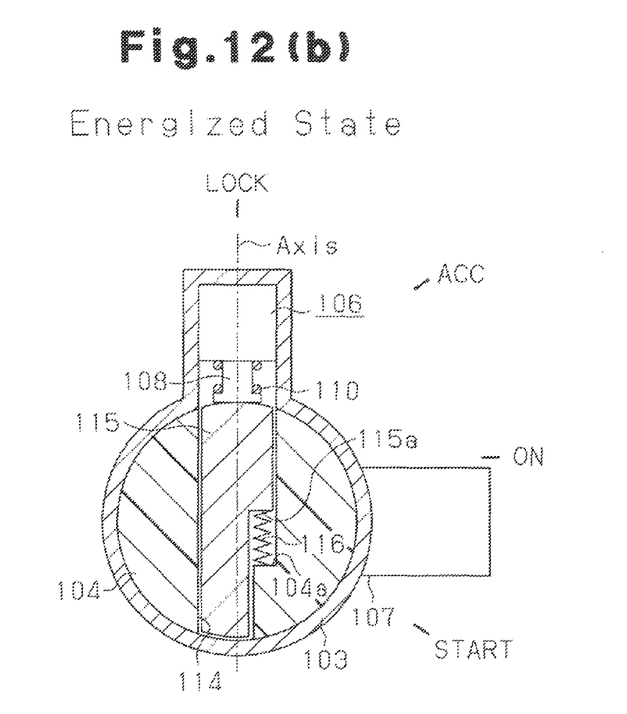

A knob lock mechanism described below permits and restricts rotation of the operation knob 102. Solenoids 106 and 107 are arranged at different locations relative to an axial direction of the ignition rotor 104. As shown in FIGS. 12(a) and 12(b), the solenoids 106 and 107 are arranged with an angular spacing when viewed in an axial direction of the ignition rotor 104. The solenoids 106 and 107, which are of a retraction type, each include a plunger 108. When energized, the plungers 108 project out of the solenoids 106 and 107 against the elastic force of springs 110 and 111.

As shown in FIG. 12(a), a pin hole 114 extends through the ignition rotor 104 in a radial direction. The axis of the pin hole 114 intersects the axis of the ignition rotor 104. A lock pin 115 is accommodated in the pin hole 114. The lock pin 115 includes a step surface 115a that extends perpendicular to the axis of the pin hole 114. The wall defining the pin hole 114 in the ignition rotor 104 includes a step surface 104a corresponding to the step surface 115a. A spring 116 couples the step surface 115a of the lock pin 115 and the step surface 104a of the ignition rotor 104. As shown in FIG. 12(a), in a de-energized state, the elastic force of the spring 116 draws the lock pin 115 from the circumferential surface of the ignition rotor 104 toward the first solenoid 106, and a projecting end of the lock pin 115 is received in a socket formed in the cylinder 103. This engages the lock pin 115 and the cylinder 103 and restricts rotation of the ignition rotor 104.

As shown in FIG. 12(b), when the first solenoid 106 is energized, the plunger 108 pushes the lock pin 115 toward the center of the ignition rotor 104 against the elastic force of the spring 110. The boundary of the plunger 108 and the lock pin 115 conforms to a sheer line between the cylinder 103 and the ignition rotor 104. This disengages the lock pin 115 from the cylinder 103 and allows the ignition rotor 104 to rotate integrally with the lock pin 115. As described above, the knob lock mechanism of the referential example includes the lock pin 115, which is arranged in the ignition rotor 104, and the solenoid 106, which is arranged in the cylinder 103.

Figure 13:
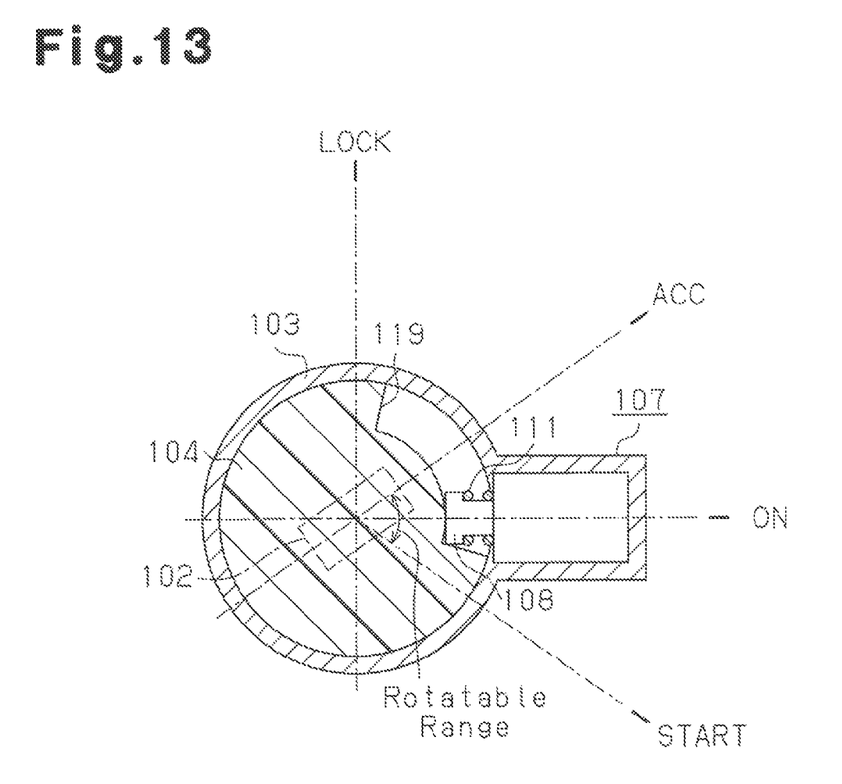
FIG. 13 is a cross-sectional view of the vehicle starter switch device taken along line D-D of FIG. 11.

With reference to FIG. 13, an interlock mechanism that restricts rotation of the operation knob 102 to the LOCK position will now be described. The second solenoid 107 is arranged on the outer surface of the cylinder 103 at a position corresponding to the ON position to restrict rotation of the ignition rotor 104 to the LOCK position. The ignition rotor 104 has a circumferential surface including a restriction groove 119 extending in the circumferential direction over a predetermined length. The length and the position of the restriction groove 119 are set so that the ignition rotor 104 can be rotated to the ACC position, the ON position, and the START position in a state in which the plunger 108 is arranged in the restriction groove 119. When the solenoid 107 is energized, the plunger 108 projects into the restriction groove 119. In this state, the ignition rotor 104 is rotatable within the range of the ACC position, the ON position, and the START position. However, rotation of the ignition rotor 104 to the LOCK position is restricted. When the solenoid 107 is de-energized, the plunger 108 moves out of the restriction groove 119. This allows the ignition rotor 104 to be rotated to the LOCK position. As described above, the interlock mechanism of the referential example includes the restriction groove 119, which is arranged in the ignition rotor 104, and the solenoid 107, which is arranged in the cylinder 103.

In the referential example, the rotation of the ignition rotor 104 from the LOCK position is restricted when the first solenoid 106 of the knob lock mechanism is de-energized, and the rotation of the ignition rotor 104 to the LOCK position is permitted when the second solenoid 107 of the interlock mechanism is de-energized. This maintains security of the vehicle even when, for example, the solenoids 106 and 107 cannot be energized due to a failure in the electrical system of the vehicle. More specifically, the ignition rotor 104, when arranged at the LOCK position, functions as a steering wheel lock that restricts the rotation of a steering wheel.

Accordingly, the knob lock mechanism restricts rotation of the ignition rotor 104 from the LOCK position when the solenoids 106 and 107 are de-energized. Thus, the steering wheel lock keeps the steering wheel locked when a failure occurs in the electrical system.

Further, when the ignition rotor 104 is arranged at a position other than the LOCK position and the solenoids 106 and 107 are de-energized, the ignition rotor 104 is allowed to rotate to the LOCK position. Accordingly, the rotor 104 is rotatable to the LOCK position even when a failure occurs in the electrical system. In the key holding type switch device, this allows for removal of the key when the ignition rotor 104 is rotated to the LOCK position.

SUMMARY OF THE INVENTION

The vehicle starter switch device of the referential example requires two solenoids 106 and 107 to restrict rotation of the rotor 104 to the LOCK position and to restrict rotation of the rotor 104 from the LOCK position to other positions. Nevertheless, it is desirable that the vehicle starter switch device be compact so that it can be arranged in a steering column.

One aspect of the present invention provides a restriction mechanism for an ignition switch that switches a power supply state of a vehicle in accordance with a rotational position of a rotor rotated in a cylinder in a first direction and a second direction. The restriction mechanism includes a first pin arranged in a pin hole extending through the rotor in a radial direction. The first pin includes a first end and a second end. The first pin is biased to project the first end outward from the rotor in the radial direction. When the rotor is arranged at a first position, the first end is in contact with an inner circumferential surface of the cylinder and the second end is arranged in the pin hole.

In restriction mechanism, a restriction portion is formed on the inner circumferential surface of the cylinder. The restriction portion includes a first side surface and a second side surface that are spaced apart from each other in a circumferential direction of the cylinder. When the rotor is rotated from the first position in the first direction, the first side surface comes into contact with the first end of the first pin that projects out of an outer surface of the rotor and restricts movement of the first end in the first direction. When the rotor is rotated toward the first position in the second direction, the second side surface permits movement of the first end of the first pin along the second side surface in the second direction.

In restriction mechanism, a lock piece is received in a slit formed extending in the circumferential direction in the cylinder. The lock piece is movable from a reference position. The lock piece includes first and second overhang portions respectively overhanging from the first and second side surfaces in opposite directions when the lock piece is arranged at the reference position. The first overhang portion includes a first inclined surface inclined relative to the inner circumferential surface of the cylinder. When the rotor is rotated, the first inclined surface is arranged in a movement path of the first end of the first pin. When the lock piece is arranged at the reference position, the lock piece is projected out of the inner circumferential surface of the cylinder by a projection height. The projection height is greater than a distance between the second end of the first pin and the outer surface of the rotor regardless of the rotational position of the rotor.

In restriction mechanism, an actuator is coupled to the lock piece. The actuator switches the lock piece between an immovable state, in which the lock piece is held at the reference position, and a movable state, in which the lock piece is movable from the reference position. A second pin is arranged at a position facing the lock piece with the rotor located in between. The second pin includes an axis and is movable along the axis. The second pin is biased toward the outer surface of the rotor. The second pin includes a distal inclined surface facing toward the first position and inclined relative to the axis and a restriction surface extending along the axis of the second pin. When the rotor is rotated from the first position in the first direction, the distal inclined surface comes into contact with the second end of the first pin.

In restriction mechanism, the actuator sets the lock piece in the immovable state to permit rotation of the rotor in the first direction from the first position to a second position. When the lock piece is in the immovable state, the second pin is moved in the axial direction when in contact with the second end of the first pin. The actuator sets the lock piece in the movable state to permit the rotor to rotate in the second direction from the second position toward the first position. The actuator sets the lock piece in the movable state to restrict rotation of the rotor from the first position to the second position. The actuator sets the lock piece in the immovable state to restrict rotation of the rotor in the second direction from the second position toward the first position.

A further aspect of the present invention is a vehicle starter switch device including a cylinder. A rotary shaft is rotatable in the cylinder to a plurality of rotational positions including a first position and a second position. An ignition switch is connected to the rotary shaft. The ignition switch switches a power supply state of a vehicle in accordance with the rotational position of the rotary shaft. A restriction mechanism restricts and permits the rotation of the rotary shaft. The restriction mechanism includes first and second restriction portions projecting inward in a radial direction from an inner surface of the cylinder to define a recess in the inner surface of the cylinder at a location corresponding to the first position. A step is formed between a bottom surface of the recess and a top surface of the first restriction portion. A first pin is movable in a pin hole that extends through the rotary shaft in the radial direction. The first pin includes a first end received in the recess when the rotary shaft is arranged at the first position. A slit is formed extending in the circumferential direction in the cylinder. A step elimination slope member is received in the slit of the cylinder. The step elimination slope member includes an inclined surface that eliminates the step, and the inclined surface is elastically movable between a reference position at which the inclined surface is arranged in the recess and a refracted position at which the inclined surface is not arranged in the recess. An actuator is coupled to the step elimination slope member, wherein when the actuator is energized. The actuator sets the step elimination slope member to be immovable at the reference position, and when the actuator is de-energized. The actuator permits the step elimination slope member to elastically move from the reference position to the retracted position as the first end of the first pin comes into contact with the inclined surface of the step elimination slope member.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A vehicle starter switch device and a restriction mechanism according to one embodiment of the present invention will now be described with reference to FIGS. 1 to 10. In the illustrated example, the vehicle starter switch device forms part of an electronic key system.

Figure 1:
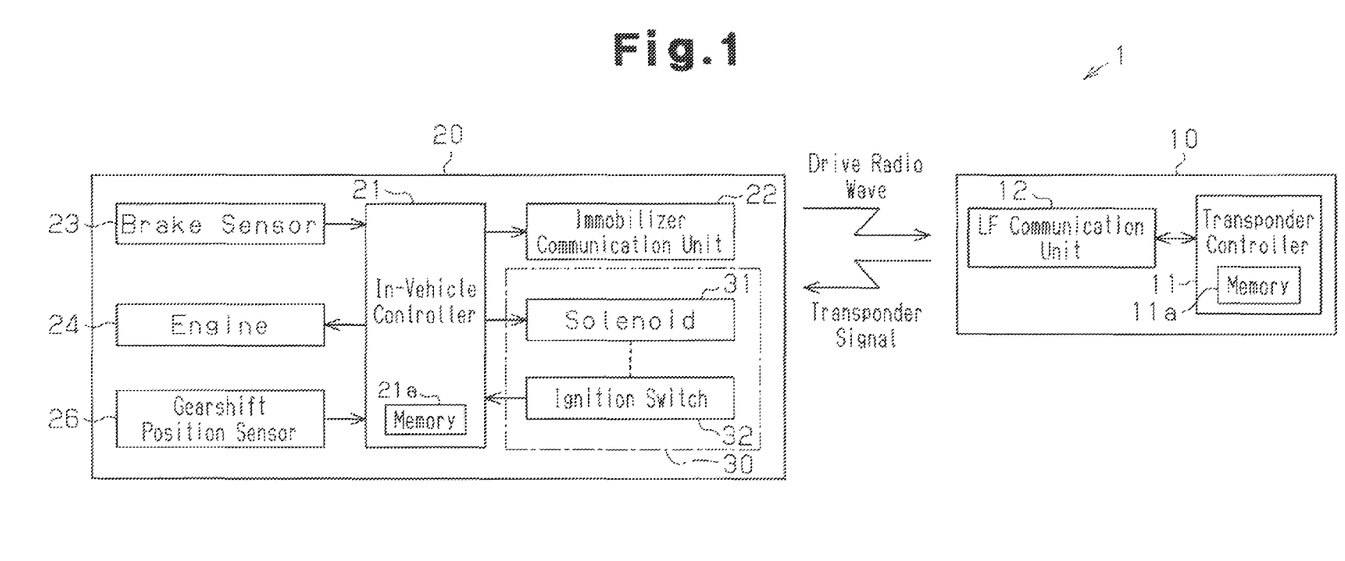
FIG. 1 is a block diagram of an electronic key system according to one embodiment of the present invention.

As shown in FIG. 1, an electronic key system 1 includes an in-vehicle device 20, which is arranged in a vehicle, and an electronic key 10, which a user carries. The in-vehicle device 20 and electronic key 10 perform ID verification through bidirectional communication.

The in-vehicle device 20 includes an in-vehicle controller 21. The in-vehicle controller 21 is electrically connected to a brake sensor 23 and an immobilizer communication unit 22. The in-vehicle controller 21 recognizes brake operations with the brake sensor 23. The in-vehicle controller 21 emits a drive radio wave, which is a wireless signal in the LF band, from the immobilizer communication unit 22 only when the brake is operated. The drive radio wave has a short range of, for example, 10 to 90 centimeters from the immobilizer communication unit 22. The in-vehicle controller 21 includes a memory 21a. The memory 21a stores a transponder code or the like.

The in-vehicle controller 21 is electrically connected to a gearshift position sensor 26. The gearshift position sensor 26 detects the position of a gear range selector, such as a gearshift lever. The gearshift lever is moved to drive position (D position), a parking position (P position), and other necessary positions. The in-vehicle controller 21 recognizes the position of the gearshift lever with the gearshift position sensor 26.

A vehicle starter switch device 30 is connected to the in-vehicle controller 21. The vehicle starter switch device 30 includes a solenoid 31 and an ignition switch 32. The vehicle starter switch device 30 generates a start request signal or a stop request signal in accordance with the operation of the user and provides the generated signal to the in-vehicle controller 21. The in-vehicle controller 21 starts or stops the engine 24 in accordance with the request signal from the vehicle starter switch device 30.

The electronic key 10 includes an LF communication unit 12, which receives a drive radio wave and transmits a transponder signal, and a transponder controller 11. The transponder controller 11 includes a memory 11a. A transponder code is registered in the memory 11a. When the electronic key 10 approaches the immobilizer communication unit 22 and the LF communication unit 12 receives a drive radio wave, the drive radio wave activates the transponder controller 11. The transponder controller 11 transmits a transponder signal, which contains the transponder code, to the LF communication unit 12. When the immobilizer communication unit 22 of the in-vehicle device 20 receives the transponder signal, the in-vehicle controller 21 verifies the transponder code contained in the transponder signal with the transponder code stored in the memory 21a. When verification is accomplished, the in-vehicle controller 21 controls the energizing of the solenoid 31 to permit or restrict the switching of the ignition switch 32.

The ignition switch 32 is selectively connected to a plurality of contacts, namely, LOCK, ACC, ON, and START contacts. The in-vehicle controller 21 switches the state of the in-vehicle device 20 and the engine 24 in accordance with the contact to which the ignition switch 32 is connected. More specifically, the in-vehicle controller 21 supplies power to none of the in-vehicle devices when the ignition switch 32 is connected to the LOCK contact. The in-vehicle controller 21 supplies power to some of the in-vehicle devices, such as the audio equipment, when the ignition switch 32 is connected to the ACC contact. The in-vehicle controller 21 supplies power to all of the in-vehicle devices when the ignition switch 32 is connected to the ON contact. The in-vehicle controller 21 starts the engine 24 when the ignition switch 32 is connected to the START contact. The in-vehicle controller 21 stops the engine 24 when the connection of the ignition switch 32 is switched from the ACC contact to the ON contact.

The structure of the vehicle starter switch device 30 will now be described. The vehicle starter switch device 30 includes a restriction mechanism having a function that is similar to that obtained from the combination of the knob lock mechanism and the key interlock mechanism of the referential example.

Figure 3:
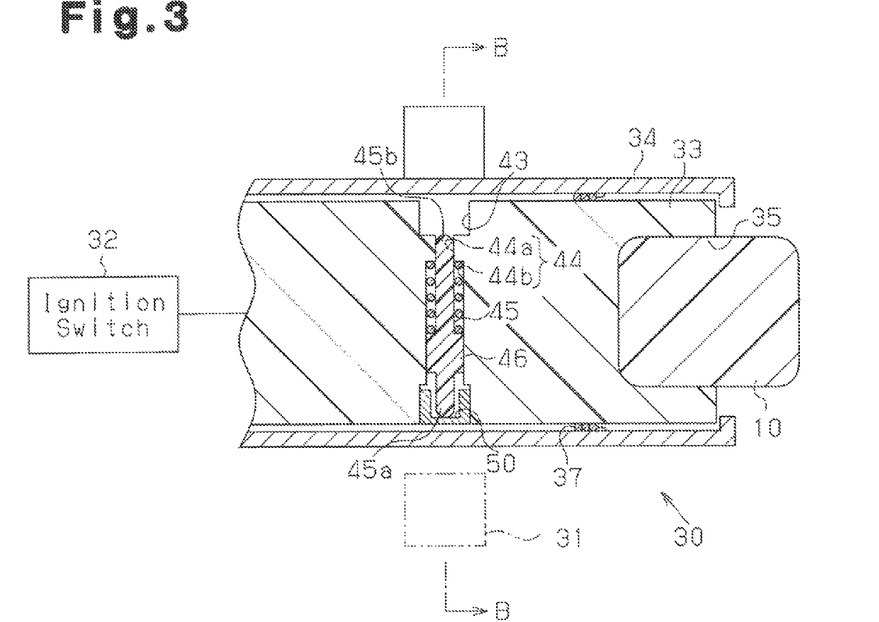
FIG. 3 is a cross-sectional view of the vehicle starter switch device taken along line A-A in FIG. 2.

As shown in FIG. 3, the vehicle starter switch device 30 includes the solenoid 31, the ignition switch 32, a cylinder 34, and a rotary shaft, namely, an ignition rotor 33, which is arranged in a rotatable manner in the cylinder 34. The ignition rotor 33 is rotatable to a plurality of switch positions. The ignition rotor may simply be referred to simply as the rotor.

Figure 2:
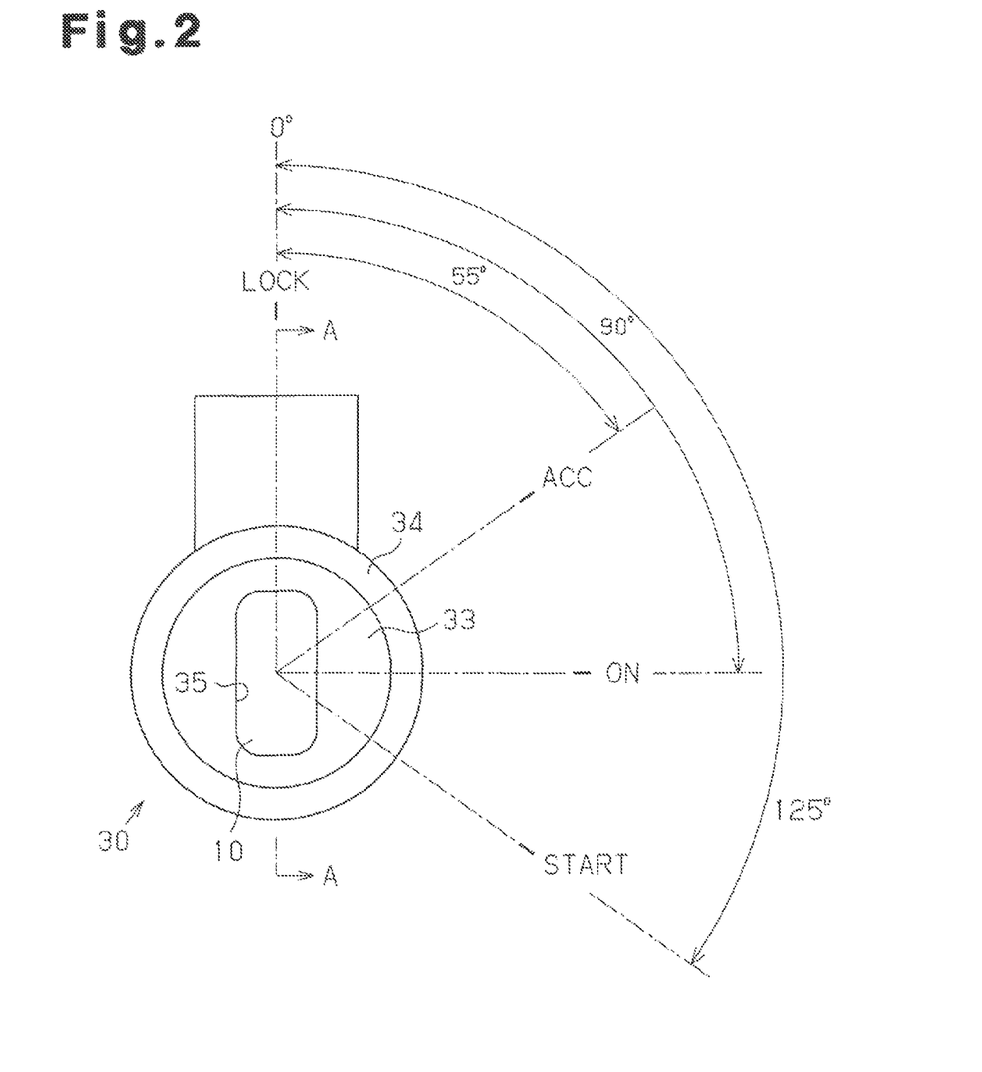
FIG. 2 is a front view of a vehicle starter switch device.

The ignition rotor 33 includes an end face exposed from the cylinder 34 with a key hole 35, into which the electronic key 10 can be inserted. The user inserts the electronic key 10 into the key hole 35 and turns the electronic key 10 to rotate the ignition rotor 33. The ignition rotor 33 is connected to the ignition switch 32. The connected contact of the ignition switch 32 switches in accordance with the rotation of the ignition rotor 33. The rotational position of the ignition rotor 33 corresponding to the LOCK contact of the ignition switch 32 is a LOCK position. In the same manner, the rotational positions of the ignition rotor 33 corresponding to the ACC, ON, and START contacts are referred to as ACC, ON, and START positions. Referring to FIG. 2, the power supply state of the vehicle is switched by rotating the ignition rotor 33 to the LOCK position, the ACC position, the ON position, and the START position with the electronic key 10. In the example of FIG. 2, the switch positions of the ignition rotor 33 including the LOCK position, the ACC position, the ON position, and the START position are arranged within an angular range of 125 degrees.

A position holding mechanism (not shown) holds the ignition rotor 33 at the LOCK position, the ACC position, or the ON position. As shown in FIG. 3, a ring-shaped return spring 37 is arranged on the circumferential surface of the ignition rotor 33. The return spring 37 has one end fixed to an inner circumferential surface of the cylinder 34 and another end fixed to the circumferential surface of the ignition rotor 33. When the ignition rotor 33 is rotated to the START position and the rotational force applied to the ignition rotor 33 is then released, the elastic force of the return spring 37 returns the ignition rotor 33 to the ON position.

A steering wheel lock restricts rotation of the steering wheel in cooperation with the rotation of the ignition rotor 33. More specifically, when the ignition rotor 33 is located at the LOCK position, the steering wheel lock restricts rotation of the steering wheel. When the ignition rotor 33 is rotated from the LOCK position to the ACC position, the steering wheel lock unlocks the steering wheel and allows the steering wheel to rotate.

Figure 4:
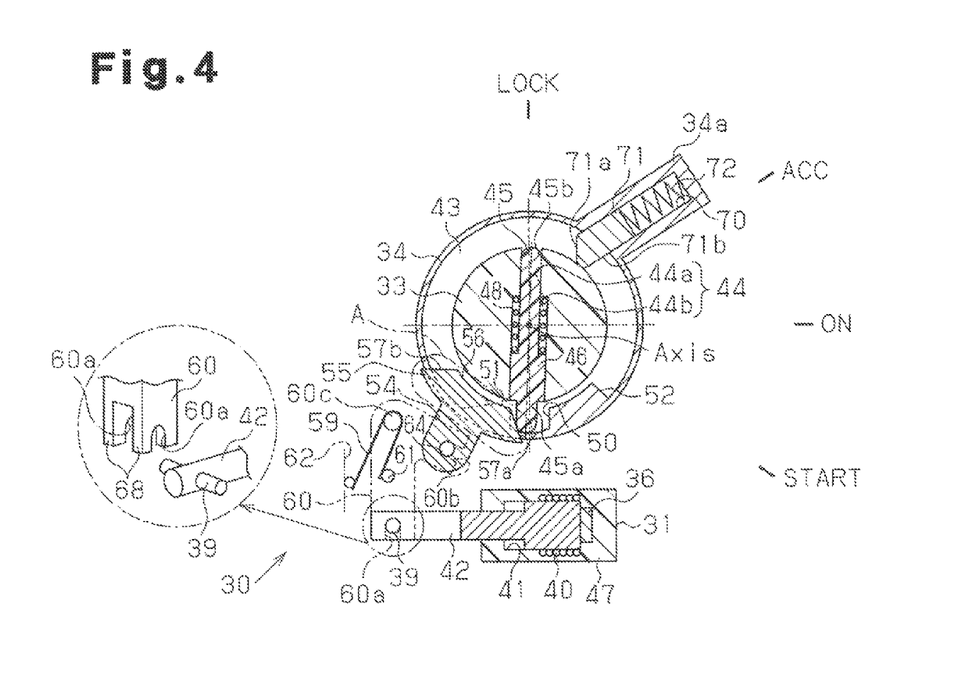
FIG. 4 is a cross-sectional view of the vehicle starter switch device taken along line B-B in FIG. 3.

FIG. 4 shows a state in which the ignition rotor 33 is held at the LOCK position. Referring to FIG. 3, the ignition rotor 33 includes an annular groove 43 extending in the circumferential direction. A pin hole 44 extends through the center of the ignition rotor 33 in the radial direction and opens at the bottom surface of the groove 43. The pin hole 44 includes two portions having different inner diameters. More specifically, the pin hole 44 includes a small diameter hole portion 44a, which is formed at the upper side as viewed in FIG. 4, and a large diameter hole portion 44b, which is formed at the lower side. A slide pin 45 is inserted into the pin hole 44. The slide pin 45, which is cylindrical, has a diameter that is substantially the same as that of the small diameter hole portion 44a. Further, part of the slide pin 45 in the axial direction forms a large diameter portion 46 having a diameter that is substantially the same as that of the large diameter hole portion 44b. As the large diameter portion 46 moves in the large diameter hole portion 44b, the slide pin 45 moves in the pin hole 44. The portion excluding the large diameter portion 46 of the slide pin 45 is referred to as a small diameter portion. The circumferential surface of the ignition rotor 33 includes the bottom surface of the groove 43.

Figure 5:
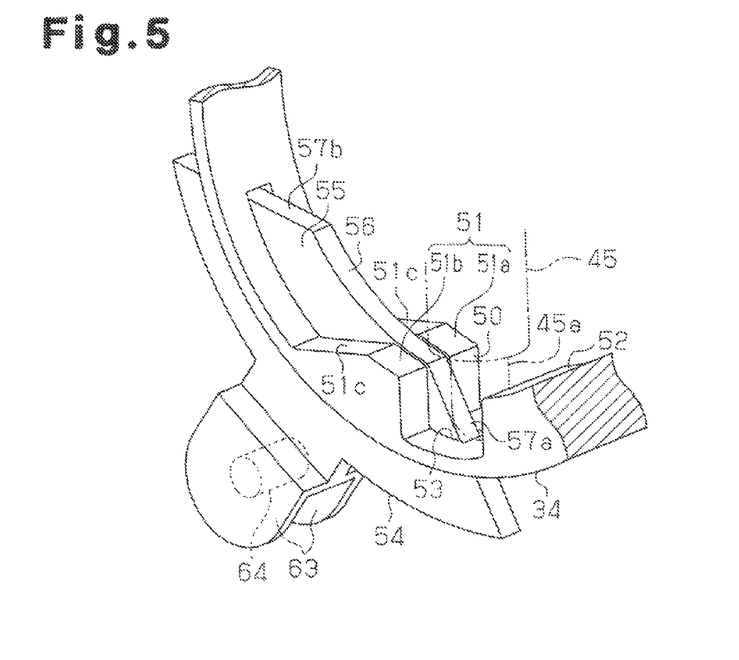
FIG. 5 is a perspective view showing range A in FIG. 4.

The length of the slide pin 45 is greater than the diameter of the ignition rotor 33 at the location of the groove 43 but less than the diameter of the ignition rotor 33 at positions excluding the groove 43. Thus, the slide pin 45 includes first and second ends 45a and 45b that are projectable out of the bottom surface of the groove 43. As shown in FIG. 5, the first end 45a of the slide pin 45 may be a thick plate having a curved distal surface. The curved distal surface of the first end 45a comes into contact with the inner circumferential surface of the cylinder 34. The distal surface of the second end 45b may be a spherical surface.

A coiled bias spring 48 is arranged on the outer surface of the slide pin 45 in the pin hole 44. The bias spring 48 is arranged between a step formed by the large diameter portion 46 and the small diameter portion and a step formed by the large diameter hole portion 44b and the small diameter hole portion 44a. The bias spring 48 biases the slide pin 45 outward in the radial direction of the ignition rotor 33. The bias spring 48 constantly biases the slide pin 45 toward the inner circumferential surface (downward in FIG. 4) of the cylinder 34, and the first end 45a of the slide pin 45 contacts the inner circumferential surface of the cylinder 34.

As shown in FIG. 4, the inner circumferential surface of the cylinder 34 includes a restriction recess 50 that receives the first end 45a of the slide pin 45. As shown in FIG. 5, the restriction recess 50 is defined by a first restriction portion 51 and a second restriction portion 52 formed in the cylinder 34. In the illustrated example, the first restriction portion 51 and the second restriction portion 52 project inward in the radial direction from the cylinder 34 and are spaced apart from each other in the circumferential direction. A gap formed between the first restriction portion 51 and the second restriction portion 52 functions as the restriction recess 50.

The first restriction portion 51 includes two trapezoidal plates, namely, restriction pieces 51a and 51b. The restriction pieces 51a and 51b are arranged next to each other with a clearance in between and extend in the axial direction of the ignition rotor 33. The clearance between the restriction pieces 51a and 51b is smaller than the diameter of the first end 45a. The top surface of the restriction pieces 51a and 51b is gradually curved to conform to the inner circumferential surface of the cylinder 34. The side surface of each of the restriction pieces 51a and 51b that define the restriction recess 50 is formed so that when the ignition rotor 33 is rotated and the first end 45a comes into contact with the side surface, movement of the slide pin 45 beyond the side surface is restricted. The second restriction portion 52 may be a rectangular solid that lies along the inner circumferential direction of the cylinder 34. The side surface of the second restriction portion 52 defining the restriction recess 50 is formed so that when the ignition rotor 33 is rotated and the first end 45a comes into contact with the side surface, movement of the slide pin 45 beyond the side surface is restricted. In this manner, the rotation of the ignition rotor 33 is restricted by contact of the first end 45a of the slide pin 45 with the two side surfaces of the restriction recess 50, that is, the side surfaces of the two restriction portions 51 and 52. In the illustrated example, the length of the slide pin 45 is preferably set so that when the first end 45a is accommodated in the restriction recess 50, the second end 45b is accommodated in the groove 43 and not projected out of the groove 43.

Each of the restriction pieces 51a and 51b includes a gradual inclined surface 51c on the side opposite to the restriction recess 50. The inclination degree of the inclined surface 51c is set to allow the first end 45a of the slide pin 45 to move along the inclined surface 51c. The inclined direction of the inclined surface 51c is set so that the inclined surface 51c becomes higher relative to the inner circumferential surface of the cylinder 34 as the restriction recess 50 becomes closer.

A slit 53, which extends in the rotation direction of the ignition rotor 33, is formed in the inner circumferential surface of the cylinder 34 between the restriction pieces 51a and 51b. The slit 53 has one end that is preferably located in the restriction recess 50.

A T-shaped lock piece 54 is arranged at a position corresponding to the slit 53 of the cylinder 34. An arcuate plate 55, which forms part of the lock piece 54, is inserted into the slit 53 from the outer side of the cylinder 34.

The arcuate plate 55 includes an inner end surface, namely, a contact surface 56, which is curved and extends along the inner circumferential surface of the cylinder 34, inclined surfaces 57a and 57b formed on opposite sides of the contact surface 56, and an outer end surface connected to a coupling portion 63. The inclined surface 57a faces toward the restriction recess 50 side, and the inclined surface 57b faces toward the opposite side. When the arcuate plate 55 is inserted into the slit 53, the inner circumferential surface of the cylinder 34 and the inclined surfaces 57a and 57b of the arcuate plate 55 form a continuously extending surface. Thus, when the ignition rotor 33 is rotated, the first end 45a of the slide pin 45 moves in the circumferential direction and in the radial direction as it comes into contact with the inclined surface 57a, the contact surface 56, and the inclined surface 57b in this order or in the opposite order. The first end 45a then moves over the first restriction portion 51. The contact surface 56 has a length that is about the same as the rotation distance of the first end 45a when the ignition rotor 33 is rotated from the LOCK position to the ACC position. The lock piece 54 includes the inclined surface 57a that eliminates the step between the bottom surface of the restriction recess 50 and the top surface of the first restriction portion 51. Thus, the lock piece 54 is also referred to as a step elimination slope member. In the example of FIG. 5, the lock piece 54 includes first and second overhang portions that respectively overhang from opposite sides of the restriction portions 51 and 52 in the circumferential direction. The inclined surfaces 57a and 57b are examples of the first and second overhang portions.

As shown in FIG. 5, the coupling portion 63 of the lock piece 54 includes two opposing plates and a cylindrical shaft 64 extending between the plates.

The outer end surface of the arcuate plate 55 has a length in the circumferential direction that is greater than the length of the slit 53. Thus, when the arcuate plate 55 is inserted into the slit 53 in the radial direction from the outer side of the slit 53, the inclined surfaces 57a and 57b come into contact with the edges of the slit 53. The position of contact serves as a reference position for the arcuate plate 55. When arranged at the reference position, the height of the arcuate plate 55 from the inner circumferential surface of the cylinder 34 is substantially the same as the height of the first restriction portion 51. The reference position is set in correspondence with the inclination angle of the inclined surfaces 57a and 57b and the length of the slit 53. The reference position may be referred to as an inward movement end of the radially movable range of the lock piece 54.

As shown in FIG. 4, the lock piece 54 is coupled to the solenoid 31 by a link 60. A link mechanism, which includes the link 60 and the solenoid 31, permits or restricts the movement of the lock piece 54 relative to the cylinder 34.

The solenoid 31 includes a resin case 47 and a plunger 42, which projects out of the case 47. The plunger 42 may be a magnetic rod. The case 47 includes a plunger chamber 41. A coil 40 is fixed to the inner surface of the plunger chamber 41. A fixed iron core 36 is arranged in the bottom surface of the plunger chamber 41. The fixed iron core 36 is contactable with an end face of the plunger 42. The plunger 42 is movable relative to the case 47 when the coil 40 is de-energized.

When the coil 40 is energized, the coil 40 generates a magnetic field that forms a magnetic attraction force between the plunger 42 and the fixed iron core 36. This attracts and fixes the plunger 42 to the fixed iron core 36. In other words, the solenoid 31 is of a sustaining type, which sustains the position of the plunger 42 when energized. In comparison with the retraction type solenoid of the referential example, the sustaining type solenoid shortens the energizing time required to fix the plunger 42 and thus reduces power consumption. Further, the sustaining type solenoid is energized for a short period and thus generates a small amount of heat. Thus, a heat dissipation mechanism may be eliminated. This contributes to miniaturization of the vehicle starter switch device 30.

As shown by the enlarged portion that is encircled in FIG. 4, a shaft 39 extends through the plunger 42 in a direction perpendicular to the axial direction of the plunger 42. The shaft 39 projects out of the distal end of the plunger 42 in opposite directions. As shown by the broken lines in FIG. 4, the link 60 is a substantially L-shaped plate and includes a shaft 60c, which is located at a middle part of the link 60. The shaft 60c pivotally supports the link 60. The link 60 has a right end including a U-shaped link groove 60b, which receives a shaft 64 of the lock piece 54. The link 60 has a lower end including two plate-shaped coupling portions 68, which sandwich the distal end of the plunger 42 from opposite sides. Each coupling portion 68 includes a U-shaped link groove 60a, which receives the shaft 39 of the plunger 42. The shaft 64 of the lock piece 54 is fitted into the link groove 60b of the link 60, and the shaft 39 is fitted into the link grooves 60a with the coupling portions 68 facing each other at opposite sides of the plunger 42. This couples the plunger 42, the link 60, and the lock piece 54. The link 60 is pivotal relative to the plunger 42 about the shaft 39 and is coupled in a pivotal manner relative to the lock piece 54 about the shaft 64.

A torsion coil spring 59 is arranged on the shaft 60c of the link 60. The torsion coil spring 59 has one end hooked to a wall surface 62 of a case of the vehicle starter switch device 30, which is shown by a broken line in FIG. 4. Further, the torsion coil spring 59 has another end hooked to a projection 61 formed on the link 60. The elastic force of the torsion coil spring 59 biases the link 60 about the shaft 60c in the counterclockwise direction (left rotation direction). The shaft 64 pushes the lock piece 54 is pushed upward (toward the cylinder 34). Thus, the lock piece 54 is held in a state fitted in the slit 53. The shaft 39 pushes the plunger 42 in an insertion direction (right direction) relative to the case 47. Thus, the plunger 42 is held in contact with the fixed iron core 36.

In the link mechanism (60, 31), when the slide pin 45 applies outward force to the lock piece 54 in the radial direction of the cylinder 34 (elastic force of bias spring 48), the shaft 64 forces the link groove 60b of the link 60 downward. This rotates the link 60 in the clockwise direction (right rotation direction) about the shaft 60c against the elastic force of the torsion coil spring 59. The shaft 39 engaged to the link groove 60a applies force to the plunger 42 in the direction (left direction) in which the plunger 42 projects out of the case 47. In this case, the plunger 42 is movable in the axial direction as long as the solenoid 31 is de-energized. Thus, the lock piece 54 is movable in the outward direction of the cylinder 34. When the solenoid 31 is energized, the plunger 42 is immovable relative to the case 47. Thus, the plunger 42 does not move toward the left, and the lock piece 54 is maintained at the reference position. In this manner, the de-energized state of the solenoid 31 corresponds to a movable state of the lock piece 54, and the energized state of the solenoid 31 corresponds to an immovable state of the lock piece 54.

As shown in FIG. 4, a hollow projection 34a projects outward from the cylinder 34 between the LOCK position and the ACC position. The projection 34a includes a cylindrical pin chamber 70 that opens in the inner circumferential surface of the cylinder 34. A polygonal lock pin 71 is accommodated in the pin chamber 70. A spring 72, which biases the lock pin 71 inward in the radial direction of the ignition rotor 33, is arranged between the lock pin 71 and the bottom surface of the pin chamber 70. The elastic force of the spring 72 forces the lock pin 71 against the bottom surface of the groove 43 of the ignition rotor 33. The lock pin 71 is located between the ACC position and the LOCK position of the ignition rotor 33.

The lock pin 71 includes a distal inclined surface 71a. The inclined surface 71a faces toward the LOCK position and away from the ACC position side. When the lock pin 71 contacts the bottom surface of the groove 43, it is preferable that there be no step or only a subtle step formed between the inclined surface 71a and the inner surface of the cylinder 34.

Figure 7A:
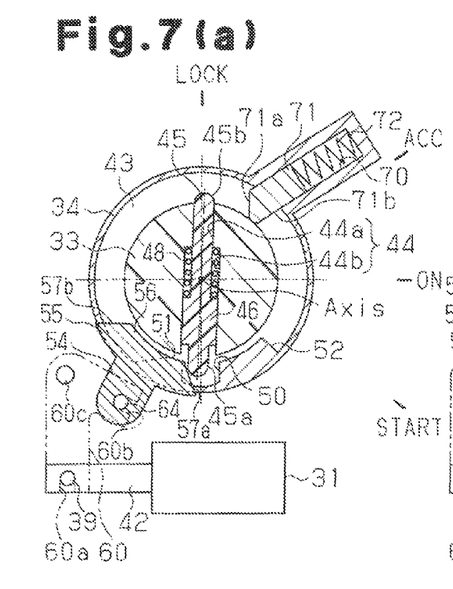
FIGS. 7(a) to 7(d) are cross-sectional views of the vehicle starter switch device taken during rotation from the LOCK position to the ACC position.
Figure 7B:
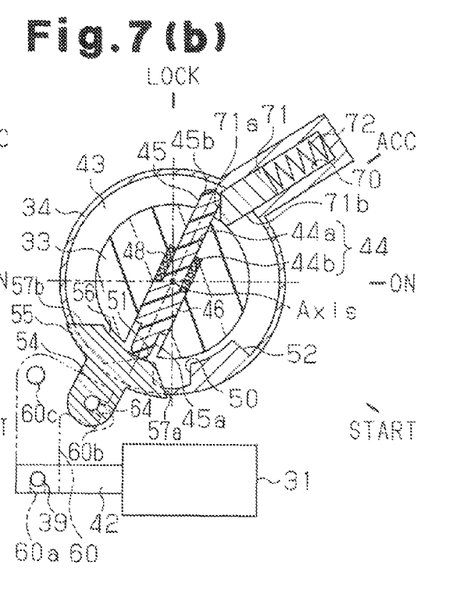
Figure 7C:
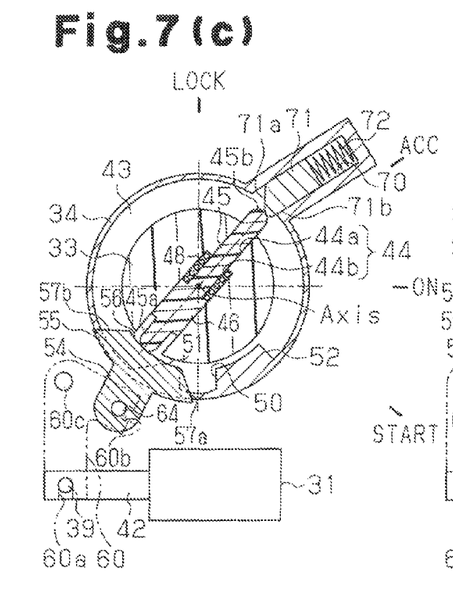
Figure 7D:
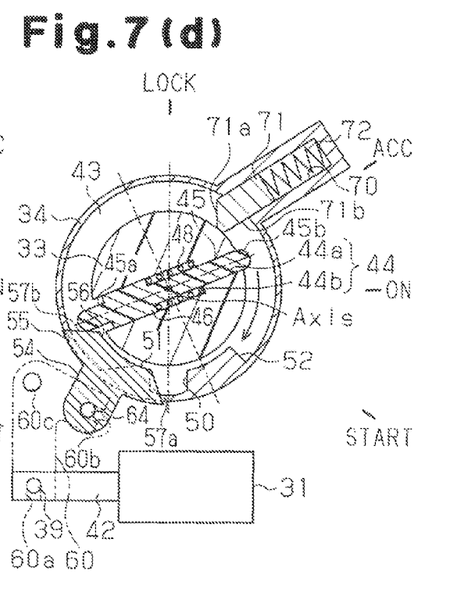

When the ignition rotor 33 is rotated from the LOCK position to the ACC position in a state in which the lock piece 54 is held at the reference position, the first end 45a of the slide pin 45 moves to the top surface of the first restriction portion 51 (restriction piece 51a and 51b) by way of the inclined surface 51c (FIGS. 7a and 7b). This also moves the slide pin 45 against the elastic force of the bias spring 48. As a result, the second end 45b of the slide pin 45 is projected out of the inner bottom surface of the groove 43 by an amount corresponding to the height of the first restriction portion 51 at a location opposite to the first restriction portion 51. The projected second end 45b contacts the inclined surface 71a before the ignition rotor 33 reaches the ACC position. Further rotation of the ignition rotor 33 toward the ACC position from this state of contact results in the second end 45b pushing the inclined surface 71a. This lifts the lock pin 71 into the pin chamber 70 against the elastic force of the spring 72 (FIG. 7c). In this manner, the ignition rotor 33 is rotatable from the LOCK position to the ACC position over the lock pin 71 in such manner. After the second end 45b moves beyond the lock pin 71, the elastic force of the spring 72 returns the lock pin 71 to its original position at which it contacts the inner bottom surface of the groove 43 (FIG. 7d).

Figure 8:
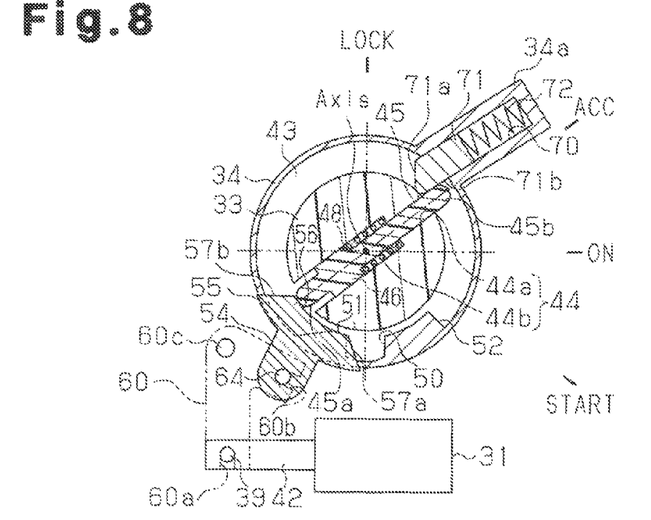
FIG. 8 is a cross-sectional view of the vehicle starter switch device in a state in which rotation to the LOCK position is restricted.

The lock pin 71 includes a restriction surface 71b facing toward the ACC position. The restriction surface 71b is substantially perpendicular to the bottom surface of the groove 43. As shown in FIG. 8, if the ignition rotor 33 is rotated from the ACC position toward the LOCK position in a state in which the second end 45b projects out of the bottom surface of the groove 43, the second end 45b contacts the restriction surface 71b. In this case, the lock pin 71 is pushed in the rotation direction of the ignition rotor 33. However, the lock pin 71 is free from a force that acts against the elastic force of the spring 72. This restricts the rotation of the ignition rotor 33 from the ACC position to the LOCK position.

Figures 9A, 9B:
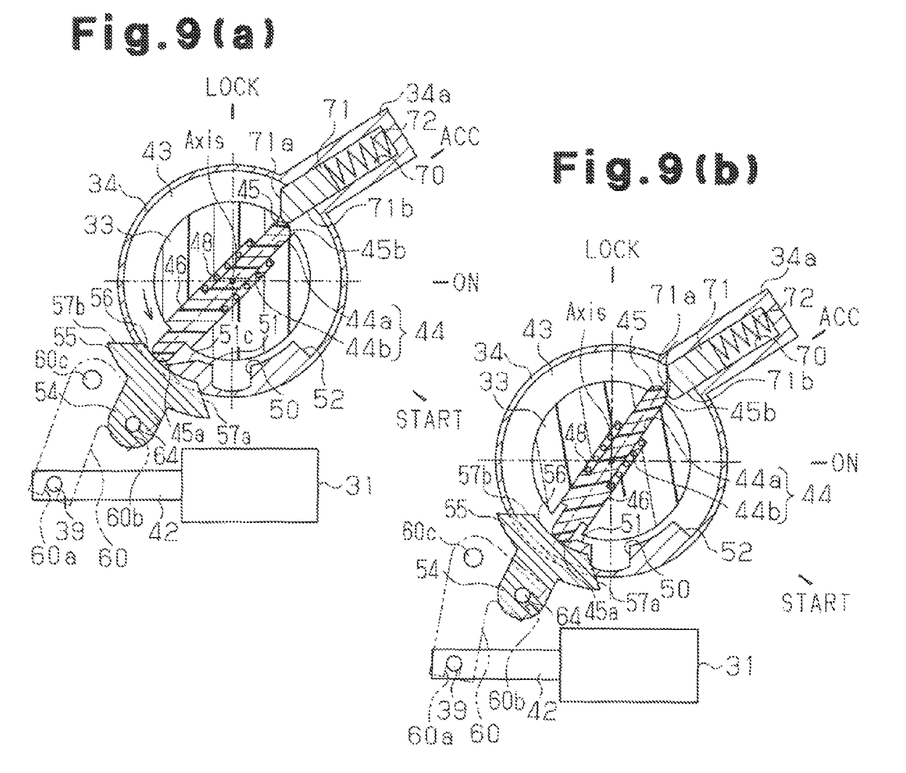
FIGS. 9(a) and 9(b) are cross-sectional views of the vehicle starter switch device taken during rotation from the ACC position to the LOCK position.
Figure 10:
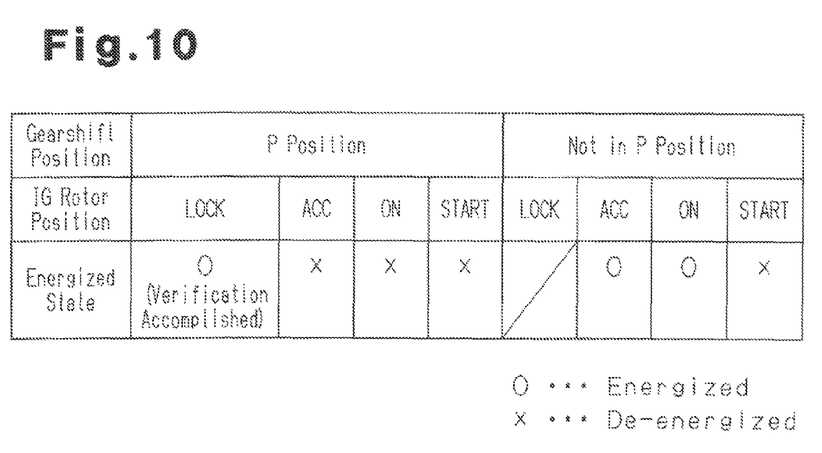
FIG. 10 is a table showing the energized state of a solenoid in correspondence with the position of a gearshift lever and an ignition rotor.

The operation of the restriction mechanism in the vehicle starter switch device 30 will now be described with reference to FIGS. 6 to 10. The in-vehicle controller 21 switches the energizing state of the solenoid 31 in accordance with the positions of the gearshift lever and ignition rotor 33, as shown in the table of FIG. 10. The in-vehicle controller 21 determines the rotational position of the ignition rotor 33 from the contact position of the ignition switch 32.

Figure 6:
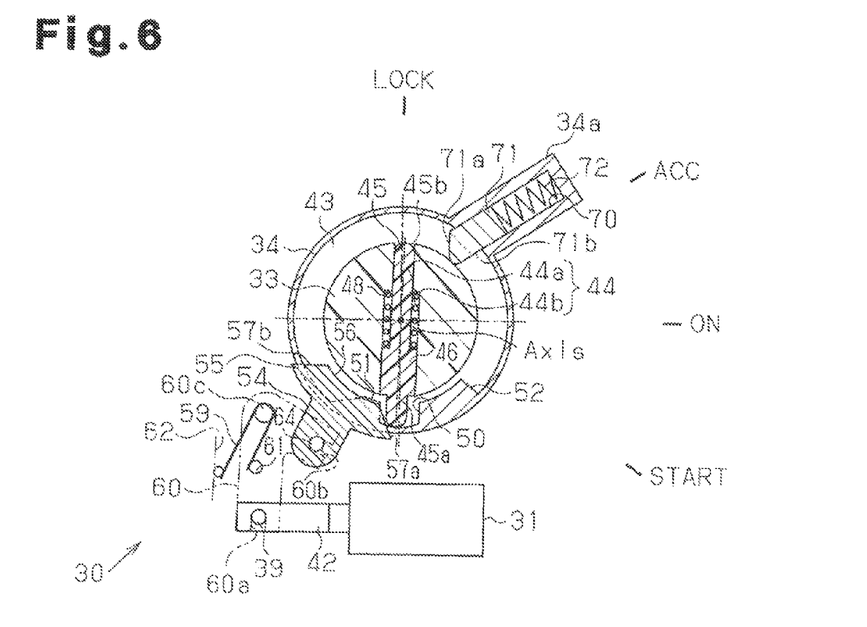
FIG. 6 is a cross-sectional view of the vehicle starter switch device showing a state in which rotation from the LOCK position is restricted.

The user first inserts the electronic key 10 into the key hole 35 to start the engine 24. Here, the gearshift lever of the vehicle is located at the P position, and the ignition rotor 33 is located at the LOCK position. When the electronic key 10 is not inserted into the key hole 35 or when an illegitimate electronic key is inserted into the key hole 35, the in-vehicle controller 21 cannot accomplish transponder code verification. Thus, the solenoid 31 is not energized. In a de-energized state, the plunger 42 of the solenoid 31 is movable relative to the case 47. In this state, the application of a force acting outward in the radial direction can move the arcuate plate 55 to a retracted position at which the inclined surface 57a is substantially moved out of the restriction recess 50. As shown in FIG. 6, when the ignition rotor 33 is rotated from the LOCK position to the ACC position, the first end 45a contacts the inclined surface 57a and forces the lock piece 54 outward. As a result, the first end 45a comes into contact with the side surface of the first restriction portion 51, which forms no step or only a subtle step in the restriction recess 50. This restricts rotation of the ignition rotor 33. Further, the second restriction portion 52 constantly restricts rotation of the ignition rotor 33 in the opposite direction from the LOCK position toward the ACC position. In this manner, the rotation of the ignition rotor 33 is restricted in a state in which the electronic key 10 is not inserted into the key hole 35.

When the electronic key 10 is legitimate and the in-vehicle controller 21 determines that transponder code verification has been accomplished, the in-vehicle controller 21 energizes the solenoid 31 in accordance with the table of FIG. 10. In an energized state, the plunger 42 is fixed to the case 47 as described above. Thus, the lock piece 54 is fixed at the reference position and immovable relative to the cylinder 34. When the ignition rotor 33 is rotated from the LOCK position, as shown in FIG. 7(a), toward the ACC position, the first end 45a moves along the inclined surface 57a of the arcuate plate 55 against the elastic force of the bias spring 48. The first end 45a then reaches the contact surface 56, as shown in FIG. 7(b). In this case, the second end 45b projects out of the bottom surface of the groove 43 and comes into contact with the inclined surface 71a of the lock pin 71.

As shown in FIG. 7(c), further rotation of the ignition rotor 33 moves the first end 45a along the contact surface 56. In this state, the second end 45b lifts the lock pin 71 in the pin chamber 70 against the elastic force of the spring 72 with the inclined surface 71a. The second end 45b then moves beyond the lock pin 71. This arranges the ignition rotor 33 at the ACC position. Referring to FIG. 7(d), when located at the ACC position, the ignition rotor 33 is rotatable to both of the ON position and the START position. As shown in the table of FIG. 10, when the ignition rotor 33 is rotated from the LOCK position to the ACC position, the gearshift lever is located at the P position. Thus, the in-vehicle controller 21 de-energizes the solenoid 31.

For example, when the user rotates the ignition rotor 33 to the START position with the electronic key 10, the in-vehicle controller 21 starts the engine 24. After the engine 24 is started, the elastic force of the return spring 37 returns the ignition rotor 33 to the ON position. The solenoid 31 remains de-energized. The user moves the gearshift lever from the P position to the D position to drive the vehicle. As shown in the table of FIG. 10, when the gearshift lever is moved from the P position to another position in a state in which the ignition rotor 33 is located at the ON position, the in-vehicle controller 21 energizes the solenoid 31.

In the energized state, rotation of the ignition rotor 33 to the LOCK position is restricted. Further, in the energized state, the lock piece 54 is fixed at the reference position, and outward movement of the lock piece 54 in the radial direction is restricted. Referring to FIG. 8, when the user attempts to rotate the ignition rotor 33 from the ACC position to the LOCK position, the first end 45a moves toward the arcuate plate 55 along the inclined surface 57b of the lock piece 54. This projects the second end 45b of the slide pin 45 out of the bottom surface of the groove 43 of the ignition rotor 33 by an amount corresponding to the climbed amount of the inclined surface 57b. When the ignition rotor 33 is rotated toward the LOCK position from this state, the second end 45b comes into contact with the restriction surface 71b of the lock pin 71. Thus, rotation of the ignition rotor 33 to the LOCK position is restricted when the gearshift lever is located at positions other than the P position.

The user moves the gearshift lever to the P position to rotate the ignition rotor 33 to the LOCK position. As shown in the table of FIG. 10, when the gearshift lever is moved to the P position, the solenoid 31 is de-energized. This allows the lock piece 54 to move outward from the cylinder 34 in the radial direction. When the ignition rotor 33 is rotated from the ACC position toward the LOCK position in this state, as shown in FIG. 9(a), the first end 45a pushes the inclined surface 57b and the contact surface 56. This moves the lock piece 54 outward, and the first end 45a thus moves along the inner circumferential surface of the cylinder 34. In this case, the slide pin 45 does not move toward the opposite side of the lock piece 54. Thus, the second end 45b does not project out of the bottom surface in the groove 43 of the ignition rotor 33. As a result, the second end 45b moves beyond the lock pin 71 as shown in FIG. 9(b) and rotates together with the ignition rotor 33 toward the LOCK position. Further rotation of the ignition rotor 33 toward the LOCK position moves the first end 45a along the inclined surface 51c and top surface of the first restriction portion 51 until the first end 45a is fitted into the restriction recess 50, as shown in FIG. 6. In other words, the ignition rotor 33 is returned to the LOCK position. As described above, the in-vehicle controller 21 de-energizes the solenoid 31 again when verification is accomplished.

In this manner, the vehicle starter switch device 30 switches the energizing state of the single solenoid 31 to restrict right rotation from the LOCK position and left rotation to the LOCK position. Since the number of solenoids is reduced, the vehicle starter switch device 30 can be reduced in size. Further, the reduction of solenoids decreases power consumption.

Rotation of the ignition rotor 33 from the LOCK position is restricted when the solenoid 31 is de-energized. Further, rotation of the ignition rotor 33 to the LOCK position is permitted when the solenoid 31 is de-energized. In the same manner as described in the BACKGROUND OF THE INVENTION section, this prevents the steering wheel from being unlocked when a failure occurs in the electrical system and allows for the ignition rotor 33 to return to the LOCK position.

In the link mechanism (60, 31), the link 60 converts outward movement of the lock piece 54 in the radial direction to an intersecting axial movement of the plunger 42. Thus, the degree of freedom for the arrangement of the solenoid 31 is increased, and the vehicle starter switch device 30 may be further reduced in size.

The first restriction portion 51 includes the two restriction pieces 51a and 51b. Thus, the first end 45a is stably supported between the restriction pieces 51a and 51b when the lock piece 54 is moved outward in the radial direction. Accordingly, the first end 45a stably moves on the first restriction portion 51.

The slide pin 45 contacts the lock pin 71, the lock piece 54, and the restriction portions 51 and 52 in the groove 43 of the ignition rotor 33. The slide pin 45 does not project out of the circumferential surface of the ignition rotor 33 excluding the groove 43. Thus, the vehicle starter switch device 30 may be further reduced in size.

The embodiment has the advantages described below.

(1) The solenoid 31 switches the lock piece 54 between an immovable state and a movable state. By switching the lock piece 54 between the immovable state and the movable state, rotation of the ignition rotor 33 is permitted and restricted. More specifically, when the solenoid 31 sets the lock piece 54 in the movable state, the first end 45a of the slide pin 45 comes into contact with the side surface of the first restriction portion 51. This restricts rotation of the ignition rotor 33 from the LOCK position toward the first restriction portion 51. When the solenoid 31 sets the lock piece 54 in the immovable state, the first end 45a of the slide pin 45 moves along the inclined surface 57a of the lock piece 54 and then beyond the first restriction portion 51. Thus, rotation of the ignition rotor 33 is not restricted. When the lock piece 54 in the immovable state, movement of the first end 45a along the lock piece 54 in the rotation direction of the ignition rotor 33 moves the slide pin 45 in the axial direction in accordance with the height of the ignition rotor 33 in the radial direction of the lock piece 54. This projects the second end 45b out of the pin hole 44. The projected second end 45b pushes the lock pin 71 with the inclined surface 71a of the lock pin 71. This permits rotation of the ignition rotor 33 toward the first restriction portion 51 from the LOCK position.

In this manner, as long as the lock piece 54 is in the immovable state when rotation of the ignition rotor 33 is permitted, movement of the ignition rotor 33 toward the LOCK position arranges the first end 45a of the slide pin 45 on the lock piece 54, which is fixed in a state fitted to the slit 53. This moves the slide pin 45 in the pin hole 44 and projects the second end 45b out of the pin hole 44 of the ignition rotor 33. Contact of the projected second end 45b with the restriction surface 71b of the lock pin 71 restricts rotation of the ignition rotor 33 to the LOCK position.

When the lock piece 54 is in the movable state, the lock piece 54 can be moved toward the solenoid 31 from the slit 53. Thus, the second end 45b allows the ignition rotor 33 to return to the LOCK position without the second end 45b projecting out of the pin hole 44 of the ignition rotor 33. In this manner, different rotation restriction ranges are set with the single solenoid 31. Thus, the vehicle starter switch device 30 may be reduced in size.

(2) When the ignition rotor 33 is arranged at the LOCK position and the solenoid 31 is de-energized, rotation (right rotation) of the ignition rotor 33 from the LOCK position is restricted. When the ignition rotor 33 is arranged at positions other than the LOCK position and the solenoid 31 is de-energized, rotation (left rotation) of the ignition rotor 33 to the LOCK position is permitted. When a failure occurs in the electrical system, the sustaining type solenoid is in a de-energized state. This prevents unauthorized unlocking of the steering wheel when a failure occurs in the electrical system and allows the ignition rotor 33 to return to the LOCK position from other positions. This improves the security of the vehicle.

(3) The link 60 converts force applied by the lock piece 54 in a direction perpendicular to the axial direction of the ignition rotor 33 to force in the axial direction of the plunger 42. This improves the degree of freedom for the locations and directions of the solenoid 31 and plunger 42. Thus, the vehicle starter switch device 30 may be further reduced in size.

(4) The annular groove 43 is formed in the circumferential surface of the ignition rotor 33, which is accommodated in the cylinder 34. The ends 45a and 45b of the slide pin 45, the distal end (inclined surface 71a) of the lock pin 71, the restriction portions 51 and 52, and the contact surface 56 of the lock piece 54 are arranged in the groove 43. The depth of the groove 43 is greater than the movable length in the axial direction of the slide pin 45. In this structure, the slide pin 45 does not project out of the circumferential surface of the ignition rotor 33 excluding the groove 43. This minimizes the gap between the ignition rotor 33 and the cylinder 34. Thus, the vehicle starter switch device 30 may be further reduced in size.

(5) The first restriction portion 51 includes two plate-shaped restriction pieces spaced apart from each other by a clearance that is smaller than the diameter of the first end 45a of the slide pin 45. The lock piece 54 is inserted to the clearance (slit 53) between the restriction pieces 51a and 51b from the outer side of the cylinder 34. In this structure, the lock piece 54 is stably supported between the restriction pieces 51a and 51b, and the first end 45a of the slide pin 45 is stably moved along the restriction pieces 51a and 51b.

It should be apparent to those skilled in the art that the present invention may be embodied in many other specific forms without departing from the spirit or scope of the invention. Particularly, it should be understood that the present invention may be embodied in the following forms.

The groove 43 of the ignition rotor 33 may be eliminated. In this case, a gap corresponding to the groove 43 is formed between the cylinder 34 and the ignition rotor 33 by deforming the cylinder 34.

One of the restriction pieces 51a and 51b of the first restriction portion 51 may be eliminated. In this case, the shape or the like of the first end 45a is preferably changed so that the first end 45a stably moves on the top surface of the first restriction portion even when the lock piece 54 is in the movable state.

The link 60 for coupling the lock piece 54 and the solenoid 31 may be eliminated. In this case, for example, the solenoid 31 is arranged so that the movement direction of the plunger 42 conforms to the movement direction of the lock piece 54. Then, the plunger 42 is directly coupled to the lock piece 54. The solenoid 31 is arranged to keep the lock piece 54 in a state moved outward from the reference position when the solenoid 31 is energized and to keep the lock piece 54 (arcuate plate 55) at the reference position when the solenoid 31 is de-energized. Such a structure has the same advantages as the embodiment described above.

In the embodiment described above, the actuator is not limited to the solenoid 31 as long as the lock piece 54 can be switched to the immovable state and the movable state.

The present examples and embodiments are to be considered as illustrative and not restrictive, and the invention is not to be limited to the details given herein, but may be modified within the scope and equivalence of the appended claims.

I claim:

1. A restriction mechanism for an ignition switch that switches a power supply state of a vehicle in accordance with a rotational position of a rotor rotatable in a cylinder in a first direction and a second direction, the restriction mechanism comprising:
   a first pin arranged in a pin hole extending through the rotor in a radial direction, wherein
   the first pin includes a first end and a second end,
   the first pin is biased to project the first end outward from the rotor in the radial direction, and
   when the rotor is arranged at a first position, the first end is in contact with an inner circumferential surface of the cylinder and the second end is arranged in the pin hole;
   a restriction portion formed on the inner circumferential surface of the cylinder, wherein
   the restriction portion includes a first side surface and a second side surface that are spaced apart from each other in a circumferential direction of the cylinder,
   when the rotor is rotated from the first position in the first direction, the first side surface comes into contact with the first end of the first pin that projects out of an outer surface of the rotor and restricts movement of the first end in the first direction, and
   when the rotor is rotated toward the first position in the second direction, the second side surface permits movement of the first end of the first pin along the second side surface in the second direction;
   a lock piece received in a slit formed in the circumferential direction in the cylinder, wherein
   the lock piece is movable from a reference position,
   the lock piece includes first and second overhang portions respectively overhanging from the first and second side surfaces in opposite directions when the lock piece is arranged at the reference position,
   the first overhang portion includes a first inclined surface inclined relative to the inner circumferential surface of the cylinder,
   when the rotor is rotated, the first inclined surface is arranged in a movement path of the first end of the first pin,
   when the lock piece is arranged at the reference position, the lock piece is projected out of the inner circumferential surface of the cylinder by a projection height, and
   the projection height is greater than a distance between the second end of the first pin and the outer surface of the rotor regardless of the rotational position of the rotor;
   an actuator coupled to the lock piece, wherein the actuator switches the lock piece between an immovable state, in which the lock piece is held at the reference position, and a movable state, in which the lock piece is movable from the reference position; and
   a second pin arranged at a position facing the lock piece with the rotor located in between, wherein
   the second pin includes an axis and is movable along the axis,
   the second pin is biased toward the outer surface of the rotor,
   the second pin includes a distal inclined surface facing toward the first position and inclined relative to the axis and a restriction surface extending along the axis of the second pin, and
   when the rotor is rotated from the first position in the first direction, the distal inclined surface comes into contact with the second end of the first pin;
   further wherein
   the actuator sets the lock piece in the immovable state to permit rotation of the rotor in the first direction from the first position to a second position;
   when the lock piece is in the immovable state, the second pin is moved in the axial direction when in contact with the second end of the first pin;
   the actuator sets the lock piece in the movable state to permit the rotor to rotate in the second direction from the second position toward the first position;
   the actuator sets the lock piece in the movable state to restrict rotation of the rotor from the first position to the second position; and
   the actuator sets the lock piece in the immovable state to restrict rotation of the rotor in the second direction from the second position toward the first position.

2. The restriction mechanism according to claim 1, further comprising a controller connected to the ignition switch, the actuator, and a lock for a vehicle steering wheel, wherein
   the controller unlocks the steering wheel when the rotor is rotated in the first direction from the first position;
   the actuator is a sustaining type solenoid including a plunger;
   the plunger of the sustaining type solenoid is coupled to the lock piece, which is constantly biased toward the reference position;
   when the solenoid is energized, the solenoid fixes the plunger so that the plunger is immovable and sets the lock piece in the immovable state; and
   when the solenoid is de-energized, the solenoid allows the plunger to move and sets the lock piece in the movable state.

3. The restriction mechanism according to claim 2, wherein
the lock piece is linearly movable from the reference position;
the sustaining type solenoid is arranged outside the cylinder so that an axis of the plunger intersects with a movement direction of the lock piece; and
the restriction mechanism further comprises a link mechanism arranged between the plunger and the lock piece to convert linear movement of the lock piece to linear movement of the plunger in the axial direction of the plunger.

4. The restriction mechanism according to claim 1, wherein the rotor includes an annular groove extending in a circumferential direction, and the outer surface of the rotor forms a bottom surface of the annular groove.

5. A vehicle starter switch device comprising:
a cylinder;
a rotary shaft rotatable in the cylinder to a plurality of rotational positions including a first position and a second position;
an ignition switch connected to the rotary shaft, wherein the ignition switch switches a power supply state of a vehicle in accordance with the rotational position of the rotary shaft; and
a restriction mechanism that restricts and permits the rotation of the rotary shaft;
wherein the restriction mechanism includes:
first and second restriction portions projecting inward in a radial direction from an inner surface of the cylinder to define a recess in the inner surface of the cylinder at a location corresponding to the first position, wherein a step is formed between a bottom surface of the recess and a top surface of the first restriction portion;
a first pin movable in a pin hole that extends through the rotary shaft in the radial direction, wherein the first pin includes a first end received in the recess when the rotary shaft is arranged at the first position;
a slit formed in the circumferential direction in the cylinder;
a step elimination slope member received in the slit of the cylinder, wherein the step elimination slope member includes an inclined surface that eliminates the step, and the inclined surface is elastically movable between a reference position at which the inclined surface is arranged in the recess and a retracted position at which the inclined surface is not arranged in the recess; and
an actuator coupled to the step elimination slope member, wherein when the actuator is energized, the actuator sets the step elimination slope member to be immovable at the reference position, and when the actuator is de-energized, the actuator permits the step elimination slope member to elastically move from the reference position to the retracted position as the first end of the first pin comes into contact with the inclined surface of the step elimination slope member.

6. The vehicle starter switch device according to claim 5, wherein the actuator is a sole electrical actuator arranged in the restriction mechanism.

7. The vehicle starter switch device according to claim 5, wherein the step elimination slope member includes an arcuate plate, the arcuate plate includes a curved inner surface that extends along the inner surface of the cylinder, and the inclined surface is formed on one side of the inner end surface.

8. The vehicle starter switch device according to claim 7, wherein
the first pin includes a second end opposite to the first end;
when the actuator is energized and the first end of the first pin is in contact with the arcuate plate, the second end projects out of the pin hole; and
when the actuator is de-energized and the first end of the first pin is in contact with the arcuate plate, the second end is movable into the pin hole.

9. The vehicle starter switch device according to claim 8, wherein when the first end of the first pin is in contact with none of the first restriction portion, the second restriction portion, and the arcuate plate, the second end is not projected out of the pin hole.

10. The vehicle starter switch device according to claim 8, further comprising a second pin supported between the first position and the second position by the cylinder with a spring, wherein the second pin is not driven by a solenoid, and the second pin is contactable with the second end of the first pin.

11. The vehicle starter switch device according to claim 10, wherein
the second pin includes an axis and is movable along the axis;
the second pin includes a distal inclined surface, which is inclined relative to the axis of the second pin, and a restriction surface, which extends along the axis of the second pin;
when the rotary shaft is rotated from the first position in a first direction, the distal inclined surface comes into contact with the second end of the first pin.

* * * * *